United States Patent
Horst et al.

(10) Patent No.: US 9,874,170 B2
(45) Date of Patent: Jan. 23, 2018

(54) CONTROL MEANS AND METHOD FOR OPERATING AN INTERNAL COMBUSTION ENGINE

(71) Applicant: GM GLOBAL TECHNOLOGY OPERATIONS LLC, Detroit, MI (US)

(72) Inventors: Stefan Horst, Neu-Isenburg (DE); Alexander Merz, Ingelheim (DE); Arnaud Schilly, Ruesselsheim (DE); Bastian Baeck, Offenbach (DE); Florin Korn, Zeilarn (DE); Nils Oth, Darmstadt (DE)

(73) Assignee: GM Global Technology Operations LLC, Detroit, MI (US)

(*) Notice: Subject to any disclaimer, the term of this patent is extended or adjusted under 35 U.S.C. 154(b) by 398 days.

(21) Appl. No.: 14/523,552

(22) Filed: Oct. 24, 2014

(65) Prior Publication Data
US 2015/0120169 A1    Apr. 30, 2015

(30) Foreign Application Priority Data
Oct. 24, 2013   (DE) .................. 10 2013 017 754

(51) Int. Cl.
*F02D 41/14*    (2006.01)
*G01M 15/10*    (2006.01)

(52) U.S. Cl.
CPC ..... *F02D 41/1495* (2013.01); *F02D 41/1402* (2013.01); *F02D 41/1443* (2013.01); *F02D 41/1454* (2013.01); *F02D 41/1498* (2013.01); *G01M 15/104* (2013.01); *F02D 2200/1015* (2013.01)

(58) Field of Classification Search
CPC .......... F02D 41/1495; F02D 41/1443; F02D 41/1498; F02D 41/1454; F02D 41/1402; F02D 2200/1015; G01M 15/104
USPC ........... 123/406.16, 406.21, 406.29, 406.37, 123/406.38; 701/111, 103; 73/35.01, 73/35.03, 35.04, 35.06
See application file for complete search history.

(56) References Cited

U.S. PATENT DOCUMENTS 4,120,269 A * 10/1978 Fujishiro ............. F02D 41/1479
                                                                      123/695
4,170,965 A * 10/1979 Aono .................. F02D 41/1479
                                                                      123/695
(Continued)

FOREIGN PATENT DOCUMENTS

DE         4401789 A1 *  8/1994  ......... F02D 41/1454
DE    102004036039 A1    6/2005
(Continued)

OTHER PUBLICATIONS

Great Britain Patent Office, Great Britain Search Report for Great Britain Application No. 1418145.7, dated Apr. 10, 2015.

*Primary Examiner* — Sizo Vilakazi
*Assistant Examiner* — Brian Kirby
(74) *Attorney, Agent, or Firm* — Lorenz & Kopf, LLP

(57) ABSTRACT

A method for operating an internal combustion engine is described in which a combustion air ratio ($\lambda$) is determined and used to determine a deviation of this combustion air ratio from an in particular default or determined set point combustion air ratio. Spontaneous ignition of the internal combustion engine are detected based on the determined deviation ($\Delta\lambda$) and used to control the operation of the engine.

11 Claims, 2 Drawing Sheets

(56) References Cited

U.S. PATENT DOCUMENTS

| | | | | |
|---|---|---|---|---|
| 4,418,567 A * | 12/1983 | Boning | F02P 5/1526 | 73/35.03 |
| 5,224,345 A * | 7/1993 | Schnaibel | F02D 41/1441 | 123/674 |
| 5,347,846 A * | 9/1994 | Kitano | G01L 23/225 | 73/35.04 |
| 5,491,975 A * | 2/1996 | Yamashita | F02D 41/1441 | 60/276 |
| 6,105,552 A * | 8/2000 | Arisawa | F02D 35/027 | 123/406.37 |
| 8,744,729 B2 | 6/2014 | Iwazaki et al. | | |
| 2002/0183919 A1 * | 12/2002 | Matsui | F02N 11/087 | 701/113 |
| 2005/0268886 A1 * | 12/2005 | Etou | F02D 15/00 | 123/406.29 |
| 2008/0295487 A1 | 12/2008 | Binder et al. | | |
| 2009/0139213 A1 * | 6/2009 | Mukai | F01N 9/00 | 60/277 |
| 2009/0240423 A1 * | 9/2009 | Fujino | F02D 37/02 | 701/111 |
| 2011/0144893 A1 * | 6/2011 | Rollinger | F02D 35/027 | 701/111 |
| 2011/0246049 A1 * | 10/2011 | Matsuo | F02D 35/02 | 701/111 |
| 2012/0085084 A1 * | 4/2012 | Bisaiji | F01N 11/007 | 60/276 |
| 2012/0186225 A1 * | 7/2012 | Amann | F02D 35/028 | 60/274 |
| 2012/0290193 A1 * | 11/2012 | Suzuki | F02D 13/0261 | 701/103 |

FOREIGN PATENT DOCUMENTS

| | | |
|---|---|---|
| DE | 102008031696 A1 | 1/2010 |
| DE | 102012014674 A1 | 10/2012 |
| DE | 102013205795 A1 | 10/2013 |
| EP | 0616122 A1 | 9/1994 |
| GB | 2512102 A | 9/2014 |

* cited by examiner

CONTROL MEANS AND METHOD FOR OPERATING AN INTERNAL COMBUSTION ENGINE

CROSS REFERENCE TO RELATED APPLICATION

This application claims priority to German Patent Application No. 102013017754.5 filed Oct. 24, 2013, which is incorporated herein by reference in its entirety.

TECHNICAL FIELD

The technical field relates to a control apparatus and to a method for operating an internal combustion engine, in particular of a motor vehicle, and to a computer program product for carrying out such a method and to a motor vehicle having such a control apparatus.

BACKGROUND

In internal combustion engines, in particular of motor vehicles, undesirable spontaneous ignition can occur before and/or after an intended ignition of the fuel-air mixture. In addition to spontaneous ignition following the intended ignition, the so-called knocking, stochastic pre-ignition (SPI), preceding the intended ignition in time can occur. Spontaneous ignition in terms of the present disclosure can in particular be a stochastic pre-ignition preceding an intended ignition in time. In addition or alternatively, spontaneous ignition in terms of the present disclosure can also be knocking following an intended ignition in time. In order to detect knocking, acoustic knocking sensors are generally known, which analyze the high-frequency oscillation components which are typical for the knocking and detect detonations in the cylinders. This solution is only conditionally suitable for detecting stochastic pre-ignition and is additionally susceptible to error. In addition, it requires construction effort through the knocking sensors.

SUMMARY

The present disclosure provides an improved operation of an internal combustion engine, in particular of a motor vehicle, in particular to reduce one or multiple of the aforementioned disadvantages.

According to an aspect of the present disclosure, a current combustion air ratio is determined in an internal combustion engine such as a spark-ignition or diesel engine, having one or multiple turbochargers. In particular, the internal combustion engine is provided with a combustion air ratio detector. The combustion air ratio can be referred to as a so-called air ratio or a so-called air number and describes a ratio, in particular weight ratio, of air that is available for the combustion and air that is required for the stoichiometric combustion or the available or combusted fuel that is available. In an embodiment, the combustion air ratio is the quotient $\lambda = {m_L}/{m_{Lst}}$ with the air mass ($m_L$) that is available for combustion and the stoichiometric air mass ($m_{Lst}$), which is at least necessary for complete combustion, or a quantity that is comparable to this quotient, for example its reciprocal value or the like.

The combustion air ratio in an embodiment can be determined through one or multiple lambda sensors that are known per se, in particular resistance jump probes and/or Nernst or voltage jump probes. In a further development, the combustion air ratio is determined through one or multiple lambda probes of a lambda or catalytic exhaust gas control. Accordingly, already existing components can be utilized in an embodiment in an additional functionality and the constructional effort reduced in this way. In an embodiment, the lambda probe(s) is/are arranged in an exhaust line or downstream of one or multiple cylinders of the internal combustion engine. As is explained in the following in more detail, a lambda probe in an embodiment can be jointly assigned to a cylinder, a selection of cylinders, in particular the cylinders of a cylinder bank, or all cylinders of the internal combustion engine jointly or determine the respective combustion air ratio for this/these.

In particular through a deviation determining means provided or equipped for this purpose, a deviation of the combustion air ratio determined by the combustion air ratio determination means and/or current combustion air ratio from a set point combustion air ratio is determined. The set point combustion air ratio in an embodiment can be a set point combustion air ratio predetermined by an emission control. Equally, it can also be a determined set point combustion air ratio, for example a set point combustion air ratio determined on the basis of preceding combustion air ratios determined through the combustion air ratio detector, as a function, for example as a medium, maximum or minimum value of determined preceding combustion air ratio values. Accordingly, a set point combustion air ratio based on determined preceding combustion air ratio values can be determined in an embodiment even without being prescribed, for example through an emission control and a deviation of the currently determined combustion air ratio from this set point combustion air ratio determined. The default or determined set point combustion air ratio can be constant or variable as a function of time or over a crankshaft angle. From this, temporary, specific enrichment or leaning-out of the mixture of the internal combustion engine can take place in an embodiment.

It has been shown that as a consequence of spontaneous ignition, in particular a stochastic pre-ignition, the combustion air ratio can change significantly. This may result from the combustion of combustion chamber deposits, which are combusted through pressure and temperature elevations as a consequence of the spontaneous ignition. Accordingly, spontaneous ignition of the internal combustion engine or in one or multiple cylinders of the internal combustion engine can be detected on the basis of the combustion air ratio.

According to an aspect of the present disclosure, spontaneous ignition of the internal combustion engine is determined through spontaneous ignition determined device provided or equipped for this purpose based on the deviation determined in particular by the deviation determining means.

As already explained above, in particular stochastic pre-ignition can also be detected in an embodiment. In addition or alternatively, detecting spontaneous ignition can be improved in an embodiment, in particular its susceptibility to error reduced. Additionally or alternatively, the constructional effort can be reduced in an embodiment, in particular when one or multiple lambda sensors which are required or available for emission control anyway are utilized for determining the combustion air ratio.

In an embodiment, detected spontaneous ignition, in particular stochastic pre-ignition can be registered, for example stored and/or signaled and the operation of the internal combustion engine monitored in this way. Additionally or alternatively, one or multiple protective measures can be carried out through a protection means provided or equipped for this purpose when, as soon as and/or for as long as spontaneous ignition is detected through the or by the spontaneous ignition detector. In an embodiment, a protective measure can include in particular be a temporary and/or constant or variable mixture enrichment. Equally, a protective measure may include a suppression of a knock control. Accordingly, undesirable spontaneous ignition can be reduced in an embodiment and the operation of the internal combustion engine thus improved and the internal combustion engine protected.

As a consequence of spontaneous ignition, and in particular stochastic pre-ignition as explained above, the combustion air ratio can change temporarily, partly significantly, in particular from a default or determined set point combustion air ratio, in an embodiment by up to 30%. In an embodiment, the difference between a determined combustion air ratio and a corresponding, in particular default or determined set point combustion air ratio or the amount of these be determined as deviation. Accordingly, simple and/or rapidly responding processing can be realized in an embodiment.

In an embodiment, this deviation or difference of the combustion air ratio from the default or determined set point combustion air ratio, the amount of these is integrated through an integrator provided or equipped for this purpose and thus determined or used as an integrated deviation. Accordingly, the detection of spontaneous ignition can be more robust and/or precise in an embodiment. Accordingly, the spontaneous ignition of the internal combustion engine is detected in an embodiment based on the integrated deviation or integrated difference between a determined combustion air ratio and an in particular default or determined set point combustion air ratio. For the more compact representation, a difference between a determined combustion air ratio and an in particular default or determined set point combustion air ratio, their amount and their or its integral are equally described as (integrated) deviation here.

In an embodiment, the integration can be effected numerically, in particular in that at in particular predetermined intervals, preferentially at discrete crankshaft angle intervals, the combustion air ratio is determined in each case and subtracted from a corresponding, in particular default or determined set point combustion air ratio and these differences, in particular their amounts added up. In this regard, an integral or integration can in particular be a sum or addition of differences of the combustion air ratios from the in particular default or determined set point combustion air ratio.

In an embodiment, spontaneous ignition of the internal combustion engine is detected when, in particular as soon and/or for as long as the determined deviation, in particular at least a difference between a determined combustion air ratio and a corresponding, in particular default or determined set point combustion air ratio, their amount or an in particular numerical integral via such differences or amounts, deviates by a predetermined amount from a predetermined limit value, in particular such detected by a comparison means. Accordingly, a simple and/or robust detection can be implemented in an embodiment. In an embodiment, the amount and/or the limit value are constant, in another embodiment the amount and/or the limit value are/is variable. Accordingly, detection in an embodiment can be adapted to different operating conditions, internal combustion engine states and the like. The amount and/or limit value can be determined in particular experimentally and/or through simulation.

In an embodiment, spontaneous ignition is detected cylinder-non-specifically. In other words, it is merely determined if spontaneous ignition, in particular stochastic pre-ignition, has occurred in any cylinder of the internal combustion engine, when the (integrated) deviation deviates from the limit value by the amount. Accordingly, the detection in an embodiment can be rendered simpler and/or more robust when in a further development the protective measure(s) are also cylinder-non-specifically, for example a mixture is globally enriched. Accordingly, the combustion air ratio detector can be arranged in an exhaust manifold or a downstream exhaust gas collection line.

In an embodiment, the spontaneous ignition is detected cylinder arrangement specifically, or in other words cylinder-specifically. Accordingly, the detection in an embodiment can be designed more precisely. Additionally or alternatively, cylinder arrangement-specific protection measures can also be carried out in a further development, for example the mixture enriched cylinder (arrangement)-specifically. Accordingly, in an embodiment, the combustion air ratio and the in particular integrated deviation are determined cylinder arrangement-specifically or for a selection of cylinders, in particular the cylinders of a cylinder bank.

In a further development, this can take place through a combustion air ratio detector, in particular one or multiple lambda probes, which is or are assigned to the cylinder arrangement, or in other words in a cylinder or a selection of cylinders, such as a cylinder bank of the internal combustion engine. Accordingly, the combustion air ratio determining means assigned to the cylinder arrangement can detect the combustion air ratio of this cylinder arrangement or be equipped for this purpose for example in that a lambda probe is arranged at the outlet of the respective cylinder or the respective cylinder bank.

Additionally or alternatively, the combustion air ratio and the in particular the integrated deviation can be determined in a detection window assigned to a cylinder arrangement, such as a cylinder of the internal combustion engine, or a cylinder (arrangement)-specific crank angle range. Spontaneous ignition in a certain cylinder is detected through an even global or central combustion air ratio determining means, a central lambda probe, for example in an exhaust manifold or a downstream exhaust collection line, in a certain crank angle range, which can be unambiguously assigned to this cylinder. In particular, the length of the crank angle range or detection window can correspond to the component of the cylinder in a complete crank revolution and/or be offset by a predetermined interval relative to a top dead center of this cylinder. The detection window, and in particular its offset relative to a top dead center of the assigned cylinder, can in an embodiment be determined experimentally and/or through simulation.

In terms of the present disclosure, means disclosed herein can be designed in the form of hardware and/or software, and in particular include an digital processing unit such as a particular microprocessor unit (CPU) which is preferably operably coupled to a storage and/or BUS system and include one or multiple programs or program modules. The CPU may be configured to execute commands which are implemented as a program stored in a storage system, to detect input signals from a data BUS and/or issue control signals to a data BUS. A storage system can include one or multiple, different storage media, such as optical, magnetic, solid-state and/or other non-volatile media. The program can be of such a type that it is capable of embodying or carrying out the methods described here, so that the CPU can carry out the steps of such methods and thereby can in particular operate the internal combustion engine, can determine and/ or integrate the deviation and/or detect the spontaneous ignition, in particular the deviation from the predetermined limit value.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
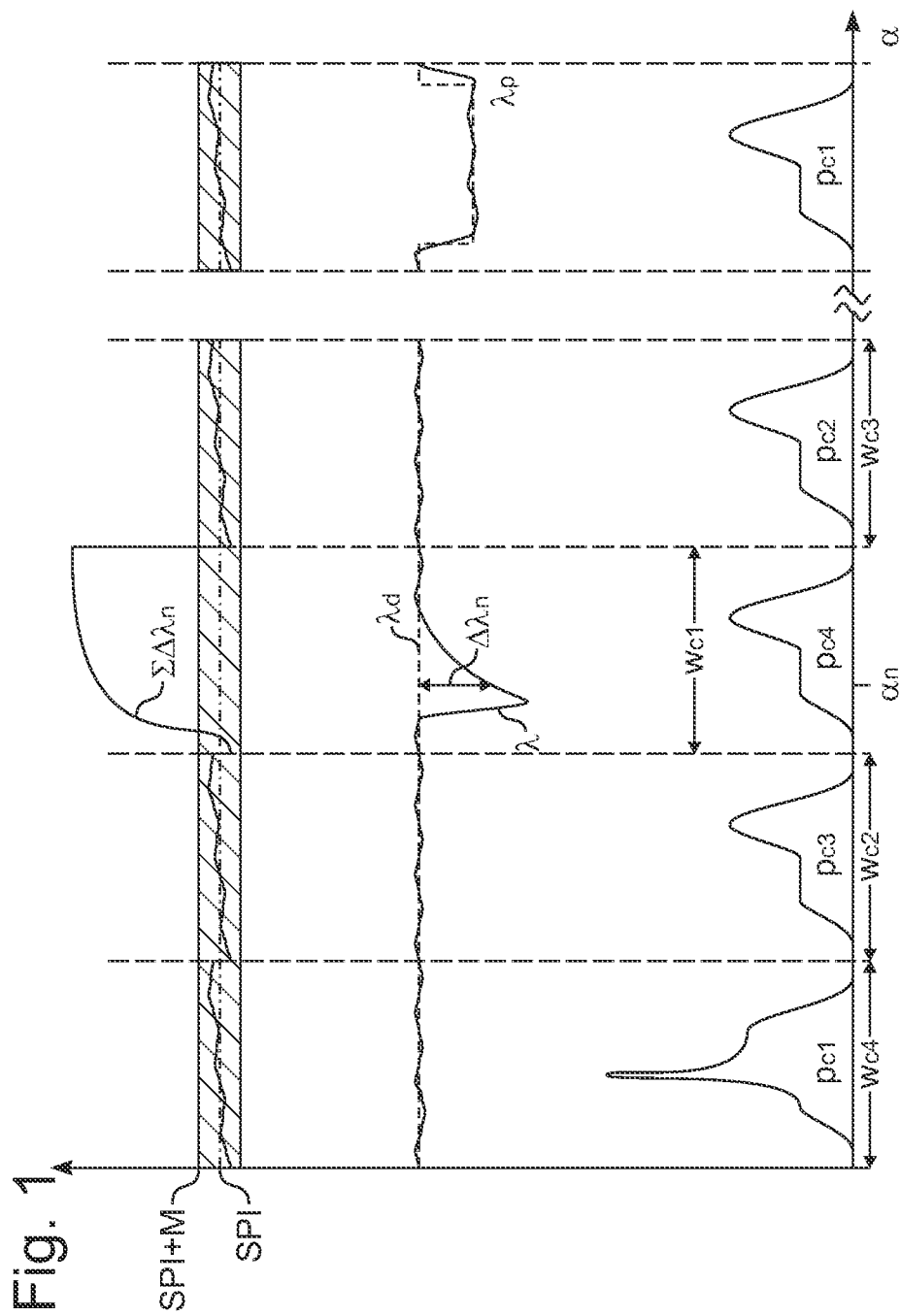
FIG. 1 a pressure curve in four cylinders (bottom), a determined and a predetermined combustion air ratio (middle) and an integral (top) of a deviation between determined and predetermined combustion air ratio of the internal combustion engine of FIG. 2 over a crankshaft angle.
Figure 2:
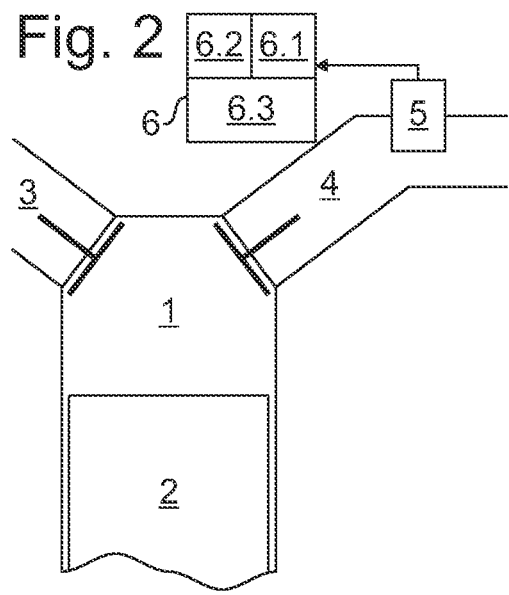
FIG. 2 a part of an internal combustion engine of a passenger car with a control apparatus according to an embodiment of the present disclosure.

The following detailed description is merely exemplary in nature and is not intended to limit the present disclosure or the application and uses of the present disclosure. Furthermore, there is no intention to be bound by any theory presented in the preceding background or the following detailed description.

An internal combustion engine having a cylinder 1 with a moveable piston 2, an inlet 3 and an exhaust outlet 4 are exemplarily shown. A lambda probe 5 is arranged with the engine, which may in a modification (not shown) be arranged centrally for all cylinders, for example in an exhaust manifold. The lambda probe 5 detects and transmits a combustion air ratio ($\lambda$), to a control apparatus in the form of an engine control unit or ECU 6.

FIG. 1 shows a pressure curve in four cylinders over a crankshaft angle ($\alpha$). Evident is the curve of the pressure in a first cylinder ($p_{c1}$), second cylinder ($p_{c2}$), third cylinder ($p_{c3}$) and fourth cylinder ($p_{c4}$) which is typical for the combustion. Here, an undesirable stochastic pre-ignition occurs in the first cylinder as is noticeable from the severe increase of the pressure ($p_{c1}$).

FIG. 1 shows in the middle a predetermined combustion air ratio ($\lambda_d$), which exemplarily is constant in particular in a crank angle range ($w_c1$). Plotted above this is the actual combustion air ratio ($\lambda$) as it is detected by the lambda probe 5. It is noticeable that it substantially follows the predetermined combustion air ratio ($\lambda_d$) in the crank angle ranges $w_{c4}$, $w_{c2}$ and $w_{c3}$.

As a consequence of the stochastic pre-ignition in the first cylinder, the lambda probe 5 however detects a significant enrichment, i.e. a dropping of the combustion air ratio ($\lambda$) in the crank angle range ($w_{c1}$). Accordingly, temporary deviations ($\Delta\lambda_n=\lambda(\alpha_n)-\lambda_d(\alpha_n)$) are obtained here over the crankshaft angle ($\alpha$) for discrete crankshaft angles ($\alpha_n$) or crankshaft angle intervals ($\alpha_n-\alpha_{n-1}$), of which one is exemplarily drawn in in FIG. 1.

Figure 3:
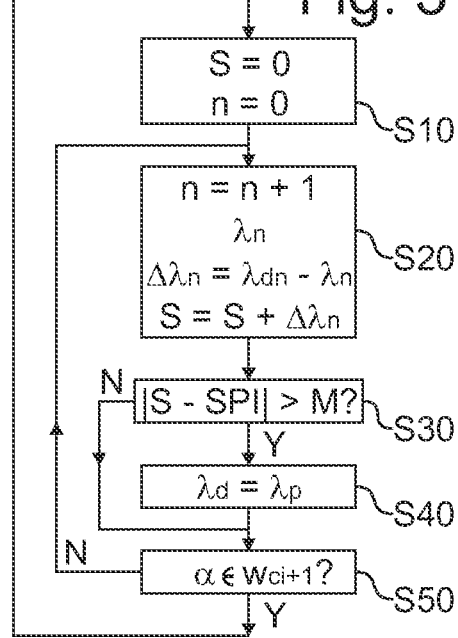
FIG. 3 a method according to an embodiment of the present disclosure for operating the internal combustion engine of FIG. 2, as it is carried out by the control apparatus of FIG. 2.

In order to detect the stochastic pre-ignition from these deviations ($\Delta\lambda_n$) or by means of the lambda probe 5, the ECU 6 carries out the method described in the following with the help of FIG. 3. To this end, the detection windows drawn in FIG. 1 are predetermined in the form of crank angle ranges ($w_{c1}$ to $w_{c4}$), which, assigned to the respective cylinders, are shifted in particular by a predetermined interval against the top dead center of these. As explained above, the combustion air ratio ($\lambda$) in the crank angle range ($w_{c1}$) substantially results from the combustion in the first cylinder, so that the significant deviation ($\Delta\lambda_n$) is correspondingly reflected here as a consequence of the stochastic pre-ignition in this cylinder, in the crank angle range ($w_{c4}$) substantially from the combustion in the fourth cylinder, in the crank angle range ($w_{c3}$) substantially from the combustion in the third cylinder and in the crank angle range ($w_{c2}$) substantially from the combustion in the second cylinder. In another internal combustion engine, the combustion air ratio can also result from the combustion in multiple cylinders, so that the detection windows are then assigned to these cylinders. Equally, each cylinder can be assigned a separate detection window also here in an embodiment in such a manner that only a stochastic pre-ignition in this cylinder causes a corresponding deviation of the combustion air ratio ($\lambda$) from the predetermined combustion air ratio ($\lambda_d$) in this detection window.

In a first step S10, when the crankshaft continues rotating into a new detection window ($w_{ci}$), an integral value (S) and a scanning value (n) are initialized. Following this, at discrete crank angle intervals or at discrete crankshaft angles ($\alpha_n$,) in each case in a step S20, the scanning value (n) is incremented (n=n+1), the respective combustion air ratio ($\lambda_n$) determined by the lambda probe 5, from this through a deviation determining means 6.1 of the ECU 6 a difference ($\Delta\lambda_n$) between the default set point combustion air ratio ($\lambda_{dn}=\lambda(\alpha_n)$) and this combustion air ratio ($\Delta_n$) determined, and the latter integrated (S=S+$\Delta\lambda_n$) through an integrator means of the deviation determining means 6.1 by addition to the integral value (S) initialized at the outset.

Then, in a step S30, a comparison means of spontaneous ignition detector 6.2 of the ECU 6 compares this integrated deviation (S) with a predetermined limit value (SPI). If the integrated deviation S deviates by a predetermined amount (M), which like the predetermined limit value SPI is indicated in FIG. 1, from the limit value (SPI) or if the integrated deviation (S) exceeds the limit value (SPI), shown as "Y" at S30, by at least the predetermined amount (M), the spontaneous ignition detector 6.2 detects spontaneous ignition in that cylinder of the internal combustion engine, which is assigned to the current detection window ($w_{ci}$), in the exemplary embodiment in the first cylinder.

Following this, a protection means 6.3 of the ECU 6 in a step S40 carries out a protective measure in that it lowers the default set point combustion air ratio ($\lambda_d$) in a working cycle next but one to a predetermined lower value ($\lambda_p$), thus enriching the mixture. This is schematically indicated in FIG. 1. If the integrated deviation (S) does not exceed the predetermined limit value (SP1) by at least the amount (M), shown as "N" in S30, the spontaneous ignition detector 6.2 does not detect any spontaneous ignition and step S40 is skipped.

In a following step S50 it is checked if a new detection window ($w_{ci+1}$) has started, i.e. the crankshaft angle has entered a new crank angle range ($w_{ci+1}$). For as long as this is not the case (S50:"N"), the method returns to step S20 so that in particular the differences ($\Delta\lambda_n$) are continued to be integrated into the integrated deviation (S). As soon as a new detection window $w_{ci+1}$ has started (S50:"Y"), the method returns to step S10, where in particular integral value (S) and scanning value n are reset or initialized.

This is shown at the top of FIG. 1, where $\Sigma\Delta\lambda_n$ is computed as follows:

$\Sigma\Delta\lambda_n=\Delta\lambda_0+\Delta\lambda_2+\ldots=[\lambda_d(\alpha_0)-\lambda(\alpha_0)]+[\lambda_d(\alpha_1)-\lambda(\alpha_1)]+$ and illustrated for the successive detection windows ($w_{c4}$, $w_{c2}$, $w_{c1}$, $w_{c3}$), the predetermined limit value (SP1) and the predetermined amount (M). It is evident that as a consequence of the stochastic pre-ignition in the first cylinder, e.g. the significant pressure increase (PC1) the combustion air ratio ($\lambda$) in the assigned detection window ($w_{c1}$) likewise significantly deviates from the default set point combustion air ratio ($\lambda_d$) and accordingly the integral of this deviation exceeds the predetermined limit value (SP1) by more than the amount (M). Based on this exceeding of the limit value (SP1) by the integrated deviation ($\Sigma\Delta\lambda_n$) the ECU 6 detects a stochastic pre-ignition in the first cylinder and can carry out appropriate protective measures.

Although in the preceding description exemplary embodiments were explained it is pointed out that a multiplicity of deviations is possible. Accordingly, a medium value ($\Sigma\lambda_n/n$) of the determined combustion air ratios ($\lambda_n$) of one or multiple preceding detection windows can also be used as a set point combustion air ratio ($\lambda_d$) can also be used instead of a set point combustion air ratio ($\lambda_d$) predetermined by an emission control. It is additionally pointed out that while at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A method for operating an internal combustion engine, in particular of a passenger car, with the steps:
   assigning a detection window to a cylinder arrangement, in particular a cylinder (1) of the internal combustion engine, wherein the detection window comprises a predetermined crank angle range ($w_{c1}$, . . . , $w_{c4}$);
   determining, in a controller, a combustion air ratio ($\lambda$) in the detection window;
   determining, in the controller, a deviation ($\Delta\lambda$) of this combustion air ratio ($\lambda$) from a predetermined set point combustion air ratio ($\lambda_d$);
   integrating, over the detection window, the deviation ($\Delta\lambda$) of the combustion air ratio ($\lambda$) from the predetermined set point combustion air ratio ($\lambda_d$) to determine an integrated deviation (S),
   detecting, with the controller, a spontaneous ignition event of the internal combustion engine based on the integrated deviation (S); and
   adjusting a controlling operation of the internal combustion engine with the controller in response to the spontaneous ignition event and based on the integrated deviation (S).

2. The method according to claim 1, wherein further comprising detecting the spontaneous ignition event of the internal combustion engine when the integrated deviation (S) deviates from a predetermined limit value (SPI) by at least a predetermined amount (M).

3. The method according to claim 2, wherein at least one of the combustion air ratio ($\lambda$) and the integrated deviation (S) are determined for a cylinder-specific arrangement.

4. The method according to claim 3, further comprising determining the air ratio ($\lambda$) is determined with a lambda probe configured to measure a given cylinder of the internal combustion engine.

5. The method according to claim 1, wherein controlling operation of the internal combustion engine when a spontaneous ignition event is detected comprises taking a protective measure selected from the group consisting of enriching a fuel-air mixture of the internal combustion engine, enrichment and enabling a knock control suppression.

6. A computer program product comprising engine control unit having a program code stored on a non-transitory medium that is readable by the engine control unit and configured to carry out the method according to claim 1.

7. A control apparatus for an internal combustion engine, in particular of a passenger car, with:
   a combustion air ratio detector configured to determine a combustion air ratio ($\lambda$) during a detection window of a cylinder arrangement, in particular a cylinder (1) of the internal combustion engine, wherein the detection window comprises a predetermined crank angle range ($w_{c1}$, . . . , $w_{c4}$);
   a comparator having an integrator, the comparator configured to determine a deviation ($\Delta\lambda$) of the combustion air ratio ($\lambda$) from a predetermined set point combustion air ratio ($\lambda_d$) and the integrator configured to integrate the deviation ($\Delta\lambda$) of the combustion air ratio ($\lambda$) from the predetermined set point combustion air ratio ($\lambda_d$) to determine an integrated deviation (S);
   a detector configured to detect a spontaneous ignition event of the internal combustion engine based on the integrated deviation (S) and;
   an engine controller configured to execute a protective measure selected from the group consisting of enriching a fuel-air mixture of the internal combustion engine, enrichment and enabling a knock control suppression based on the spontaneous ignition event and the integrated deviation (S).

8. The control apparatus of claim 7 wherein the combustion air ratio detector comprises at least one lambda probe.

9. The control apparatus according to claim 7 wherein the comparator is further configured to detect when the integrated deviation (S) deviates from a predetermined limit value (SPI) at least by a predetermined amount (M).

10. The control apparatus according to claim 7, wherein the combustion air ratio detector of a cylinder arrangement is assigned to a cylinder of the internal combustion engine.

11. A motor vehicle comprising an internal combustion engine and a control apparatus according to claim 7.

* * * * *